(12) United States Patent
Wada

(10) Patent No.: US 7,110,002 B2
(45) Date of Patent: Sep. 19, 2006

(54) IMAGE DISPLAYING SYSTEM OF ENVIRONMENT-ADAPTIVE TYPE, PRESENTATION SYSTEM, AND IMAGE PROCESSING METHOD AND PROGRAM

(75) Inventor: Osamu Wada, Ima (JP)

(73) Assignee: Seiko Epson Corporation, Tokyo (JP)

( * ) Notice: Subject to any disclaimer, the term of this patent is extended or adjusted under 35 U.S.C. 154(b) by 488 days.

(21) Appl. No.: 10/019,698

(22) PCT Filed: May 2, 2001

(86) PCT No.: PCT/JP01/03791

§ 371 (c)(1),
(2), (4) Date: Jan. 2, 2002

(87) PCT Pub. No.: WO01/86620

PCT Pub. Date: Nov. 15, 2001

(65) Prior Publication Data

US 2003/0011563 A1    Jan. 16, 2003

(30) Foreign Application Priority Data

May 8, 2000    (JP)    ............................. 2000-134893

(51) Int. Cl.
  *G09G 5/02*    (2006.01)
  *H04N 5/14*    (2006.01)

(52) U.S. Cl. ...................... 345/600; 348/602
(58) Field of Classification Search ................ 345/102, 345/101, 207, 63, 211, 600–604; 349/61; 348/602–603; 315/157, 61–64

See application file for complete search history.

(56) References Cited

U.S. PATENT DOCUMENTS

| | | | | | |
|---|---|---|---|---|---|
| 4,246,600 | A | * | 1/1981 | Nakagawa et al. | 348/277 |
| 4,451,849 | A | * | 5/1984 | Fuhrer | 348/602 |
| 4,834,508 | A | * | 5/1989 | Fergason | 349/79 |
| 4,953,953 | A | * | 9/1990 | Fergason | 349/79 |
| 5,057,744 | A | * | 10/1991 | Barbier et al. | 315/10 |
| 5,270,818 | A | * | 12/1993 | Ottenstein | 348/602 |
| 5,345,322 | A | * | 9/1994 | Fergason | 349/79 |
| 5,406,305 | A | * | 4/1995 | Shimomura et al. | 345/102 |
| 5,485,172 | A | * | 1/1996 | Sawachika et al. | 345/8 |
| 5,760,760 | A | * | 6/1998 | Helms | 345/102 |
| 5,952,992 | A | * | 9/1999 | Helms | 345/102 |
| 5,956,004 | A | * | 9/1999 | Hush et al. | 345/74.1 |
| 6,043,909 | A | * | 3/2000 | Holub | 358/504 |
| 6,094,185 | A | * | 7/2000 | Shirriff | 345/102 |
| 6,118,455 | A | * | 9/2000 | Hidaka et al. | 345/589 |

(Continued)

FOREIGN PATENT DOCUMENTS

EP    0 624 028 B1    7/2000

(Continued)

OTHER PUBLICATIONS

U.S. Appl. No. 10/031,441, filed Jan. 22, 2002, Osamu Wada.

*Primary Examiner*—Sumati Lefkowitz
*Assistant Examiner*—Alecia D. Nelson
(74) *Attorney, Agent, or Firm*—Oliff & Berridge, PLC

(57) ABSTRACT

To provide an environment-compliant image display system, a presentation system, an image processing method, and a program, a colored-light information processing section 140 is used to create XYZ values that take into account a visual environment, based on colored-light information (more precisely, RGB or XYZ tristimulus values) that has been measured by a colored-light sensor 60, and a profile management section 130 is used to correct the input-output profiles of the projector.

21 Claims, 13 Drawing Sheets

U.S. PATENT DOCUMENTS

| | | | |
|---|---|---|---|
| 6,144,359 A * | 11/2000 | Grave | 345/102 |
| 6,456,340 B1 * | 9/2002 | Margulis | 348/745 |
| 6,480,202 B1 * | 11/2002 | Deguchi et al. | 345/600 |
| 6,504,625 B1 * | 1/2003 | Amero et al. | 358/1.9 |
| 6,529,212 B1 * | 3/2003 | Miller et al. | 345/690 |
| 6,594,387 B1 * | 7/2003 | Pettitt et al. | 382/167 |
| 6,690,351 B1 * | 2/2004 | Wong | 345/156 |
| 6,710,763 B1 * | 3/2004 | Iinuma | 345/102 |

FOREIGN PATENT DOCUMENTS

| | | |
|---|---|---|
| JP | A 4-136925 | 5/1992 |
| JP | A 7-15612 | 1/1995 |
| JP | A 9-98301 | 4/1997 |
| JP | A 9-107484 | 4/1997 |
| JP | A 9-186896 | 7/1997 |
| JP | A 10-62865 | 3/1998 |
| JP | A 10-65930 | 3/1998 |
| JP | A 10-105145 | 4/1998 |
| JP | A 10-304395 | 11/1998 |
| JP | A 11-75072 | 3/1999 |
| JP | A 11-85952 | 3/1999 |
| JP | A 11-175048 | 7/1999 |
| JP | A 2000-66166 | 3/2000 |
| JP | A 2001-238222 | 8/2001 |
| WO | WO 99/23637 | 5/1999 |

\* cited by examiner

IMAGE DISPLAYING SYSTEM OF ENVIRONMENT-ADAPTIVE TYPE, PRESENTATION SYSTEM, AND IMAGE PROCESSING METHOD AND PROGRAM

TECHNICAL FIELD

The present invention relates to an image display system, a presentation system and an image processing method of environment-compliant type, and a program.

BACKGROUND OF ART

When presentations or meetings are held at a plurality of different locations, an important part of achieving effective presentations is to make it possible to reproduce images exactly as the creator of those images intended, whatever the location.

One way of considering how to adjust the view of such images is management of the input-output characteristics of the device to achieve color management in the reproduction of colors, but specific methods for achieving this are not obvious.

When projecting an image with a projector and screen, in particular, it is difficult to reproduce colors in a suitable manner without considering not only ambient light but also the screen type.

Recent advances in increasing resolution of projectors have made color reproducibility important as well.

In addition, projectors have recently become smaller and easier to carry. For that reason, it has become possible to perform presentations at a client's location, by way of example, but it is difficult to adjust colors to match the environment at the client's location and the manual adjustment of colors at the client's location takes too much time.

DISCLOSURE OF INVENTION

The present invention was devised in the light of the above technical problems and has as an objective thereof the provision of an image display system, presentation system and image processing method of environment-compliant type, and program that make it possible to reproduce substantially the same colors within a short time-frame at a plurality of different locations.

(1) In order to solve the above-described technical problems, an environment-compliant type image display system in accordance with the present invention relates to an image display system which corrects a color of an image and displays the image, based on visual environment information generated by visual environment detection means which detects a visual environment in a display region of the image, the image display system comprising:

colored-light information processing means which converts a given color within the visual environment information into a coordinate value within a given color space, and obtains a coordinate value forming a complementary color pair with the converted coordinate value, based on a coordinate value within the given color space of the given color within a given reference environment and the converted coordinate value; and correction means which corrects input-output characteristic data for display that is used by means of displaying the image, based on the obtained coordinate value forming the complementary color pair.

The present invention makes it possible to display an image that is optimized for the environment at the time of the display, by correcting input-output characteristic data for display that is used by an image display means, based on a coordinate value that form a complementary color pair with a coordinate value that take account of environmental information. This makes it possible to overcome differences in display environment and thus display the same image regardless of the environment. It is therefore possible to reproduce substantially the same colors within a short time-frame at a plurality of different locations.

In particular, it is possible to remove the influence of ambient light that affects the ideal colored light, and thus obtain an ideal white balance, by correcting the input-output characteristic data for each one of a number of grayscales, based on a coordinate value that form complementary color pairs.

Note that the "visual environment" in this case refers to factors such as the ambient light (such as lighting or natural light) and the object on which the image is displayed (such as a display, wall surface, or screen).

It is desirable that the given color is white (grey), but the present invention is not limited to white.

The color space refers to a L*a*b* (or Lab, hereinafter abbreviated to "Lab") space, a L*u*v* space, a L*C*h space, a U*V*W* space, or a xyY (or Yxy) space.

The complementary color pair is a pair of colors that form grey when mixed together.

One of or a combination of a luminance sensor that measures the luminance value of the display region, a colored-light sensor that measures the RGB values or XYZ values of the display region, and a chromaticity sensor that measures chromaticity of the display region may be used as the visual environment detection means, by way of example.

(2) In this image display system, the colored-light information processing means may obtain an inverse vector of a bound vector that indicates a coordinate position of the converted coordinate value within the color space, as the coordinate value forming the complementary color pair, and the correction means may correct the input-output characteristic data, using the obtained inverse vector as a correction value.

This makes it possible to correct the input-output characteristic data quantitatively, thus enabling high-speed conversion. In particular, it is possible to use the input-output characteristic data to determine colored-light information for each of given grayscale units, by correcting the input-output characteristic data for each of the grayscale units.

Note that a "bound vector" in this case is a bound vector at a point that forms grey in the given color plane within the color space. The term "vector" in this case refers to a vector having magnitude and direction.

(3) in this image display system, the correction means may perform gamma correction as correction of the input-output characteristic data, based on the coordinate value forming the complementary color pair.

This enables accurate color reproduction by performing gamma correction.

(4) With this image display system, the colored-light information processing means may obtain coordinate values of a plurality of complementary color pairs for each given grayscale unit.

This makes it possible to apply corrections that conform to the grayscales to be reproduced, even when colors are reproduced at each grayscale, by obtaining a coordinate value for a plurality of complementary color pairs for each grayscale unit. It is therefore possible to perform an optimal image display, regardless of the grayscales to be reproduced.

(5) With this image display system, the visual environment detection means may comprise means which detects the visual environment by measuring at least ambient light.

This makes it possible to detect the visual environment by measuring the ambient light. In such a visual environment, ambient light can have a large effect on the view of the image. It is possible to detect the visual environment appropriately by measuring the ambient light that is a major factor governing how an image is seen.

(6) An environment-compliant type presentation system in accordance with the present invention relates to a presentation system which corrects a color of a presentation image and displays the presentation image, adapting to a visual environment, the presentation system comprising:

visual environment detection means which detects the visual environment within a display region of the presentation image, and creates visual environment information;

colored-light information processing means which converts the visual environment information into a coordinate value within a given color space, and obtains a coordinate value forming a complementary color pair with the converted coordinate value, based on a coordinate value within the given color space of the given color within a given reference environment and the converted coordinate value;

correction means which corrects input-output characteristic data for display that is used by means of displaying the image, based on the obtained coordinate value forming the complementary color pair; and display means which displays the presentation image, based on the corrected input-output characteristic data.

(7) A program embodied on an information storage medium or in a carrier wave, which is a program for correcting a color of a presentation image and displaying the presentation image, adapting to a visual environment, the program implementing in a computer:

visual environment detection means which detects the visual environment within a display region of the presentation image, and creates visual environment information;

colored-light information processing means which converts the visual environment information into a coordinate value within a given color space, and obtains a coordinate value forming a complementary color pair with the converted coordinate value, based on a coordinate value within the given color space of the given color within a given reference environment and the converted coordinate value;

correction means which corrects input-output characteristic data for display that is used by means of displaying the image, based on the obtained coordinate value forming the complementary color pair; and means which controls a display means to display the presentation image, based on the corrected input-output characteristic data.

(8) An information storage medium in accordance with the present invention relates to an information storage medium that can be used by a computer, the information storage medium including a program for a computer to implement the above-described means.

The present invention makes it possible to display an image that is appropriate for the environment at the display, by correcting input-output characteristic data for display that is used by an image display means, based on a coordinate value that form a complementary color pair with a coordinate value that take account of environmental information. This makes it possible to overcome differences in display environments, so that the same image can be displayed regardless of the environment in which it is used. It is therefore possible to reproduce substantially the same colors within a short time-frame at a plurality of different locations.

Note that the "visual environment" in this case refers to factors such as the ambient light (such as lighting or natural light) and the object on which the image is displayed (such as a display, wall surface, or screen).

It is desirable that the given color is white (grey), but the present invention is not limited to white.

In addition, the color space refers to a L*a*b* (abbreviated to "Lab") space, a L*u*v* space, a L*C*h space, a U*V*W* space, or a xyY (or Yxy) space.

A complementary color pair is a pair of colors that form grey when mixed together.

(9) With this presentation system, program, and information storage medium, the correction means may perform gamma correction as correction of the input-output characteristic data, based on the coordinate value forming the complementary color pair.

This enables accurate color reproduction by performing gamma correction.

(10) With this presentation system, program, and information storage medium, the display region may be a region on a screen, and the display means may comprise projection means which projects the presentation image towards the screen.

This makes it possible to detect the visual environment of the display region, which readily affects to the visual environment, such as a screen, and thus make it possible to reproduce substantially the same colors regardless of the visual environment, by performing gamma correction before projecting the presentation image.

Note that the screen may be of a reflective type or a transmissive type.

(11) With this presentation system, the visual environment detection means may detect a visual environment that takes into account a type of the screen.

(12) With this program and information storage medium, the visual environment detection means may detect a visual environment that takes into account at least a type of screen.

This makes it possible to detect a visual environment that takes into account the type of the screen, then overcome differences in the types of screen by performing gamma correction based on the detection result. This makes it possible to reproduce substantially the same colors, regardless of the type of screen.

With a PC that uses an OS containing a conventional color management system, in particular, only the type of display that is connected to the PC is taken into consideration. There have been proposals for color correction that takes ambient light into consideration, but there is nothing that considers a screen as the display region of an image.

The present invention makes it possible to generate and display an image that takes account of the visual environment as appropriate, by detecting the visual environment with respect to the type of the screen then performing the color correction.

(13) With this presentation system, the visual environment detection means may comprise means which detects the visual environment by measuring at least ambient light.

(14) With this program and information storage medium, the visual environment detection means may detect a visual environment that takes into account at least ambient light.

This makes it possible to detect the visual environment by means such as measuring ambient light. In the visual environment, ambient light has a large effect on the view of the image. It is possible to detect the visual environment appropriately by measuring the ambient light that is the main factor concerning how an image is seen.

(15) An environment-compliant type image processing method in accordance with the present invention relates to an image processing method which corrects a color of an image adapting to a visual environment, the method comprising:

a step of detecting a visual environment;

a conversion step of converting the detected visual environment into a coordinate value within a given color space;

a coordinate-value calculation step of obtaining a coordinate value forming a complementary color pair with a coordinate value converted by the conversion step, based on a coordinate value within the given color space of the given color in a given reference environment and the converted coordinate value;

a correction step of correcting input-output characteristic data for display, based on the obtained coordinate value forming the complementary color pair; and a step of displaying an image, based on the corrected input-output characteristic data.

The present invention makes it possible to display an image that is optimized for the environment at the time of the display, by correcting input-output characteristic data for display that is used by an image display means, based on a coordinate value that form a complementary color pair with a coordinate value that take account of environmental information. This makes it possible to overcome differences in display environment and thus display the same image regardless of the environment. It is therefore possible to reproduce substantially the same colors within a short timeframe at a plurality of different locations.

Note that the "visual environment" in this case refers to factors such as the ambient light (such as lighting or natural light) and the object on which the image is displayed (such as a display, wall surface, or screen).

It is desirable that the given color is white (grey), but the present invention is not limited to white.

In addition, the color space refers to a Lab space, a L*u*v* space, a L*C*h space, a U*V*W* space, or a xyY (or Yxy) space.

The complementary color pair is a pair of colors that form grey when mixed together.

(16) The coordinate-value calculation step may comprise a step of obtaining an inverse vector of a bound vector that indicates a coordinate position of the converted coordinate value within the color space, as the coordinate value forming the complementary color pair, and the correction step may comprise a step of correcting the input-output characteristic data, using the obtained inverse vector as a correction value.

This makes it possible to correct the input-output characteristic data quantitatively, thus enabling high-speed conversion.

Note that a "bound vector" in this case is a bound vector at a point that forms grey in the given color plane within the color space. The term "vector" in this case refers to a vector having magnitude and direction.

(17) The coordinate-value calculation step may comprise a step of obtaining a coordinate position of an externally dividing point that forms a coordinate position of the coordinate value forming the complementary color pair, based on a distance between a coordinate position of the converted coordinate value in the conversion step and a given origin within the color space, as the coordinate value forming the complementary color pair, and the correction step may comprise a step of correcting the input-output characteristic data, as a corrected value for the coordinate position of the obtained externally dividing point.

This makes it possible to correct the input-output characteristic data quantitatively, thus enabling high-speed correction.

(18) In addition, gamma correction, as correction of the input-output characteristic data based on the coordinate value forming the complementary color pair, may be performed in the correction step.

This ensures accurate color reproduction by performing gamma correction.

(19) Correction of a color reproduction region, as correction of the input-output characteristic data based on the coordinate value forming the complementary color pair, may be performed in the correction step.

This ensures accurate color reproduction by correcting the color reproduction region.

Note that the color reproduction region is a region such as a RGB color triangle, CMY color triangle, or CMYK color quadrangle, to be more specific.

(20) The coordinate-value calculation step may comprise a step of obtaining coordinate values of a plurality of complementary color pairs for each given grayscale unit.

This makes it possible to apply corrections that conform to the grayscales to be reproduced, even when colors are reproduced at each grayscale, by obtaining a coordinate value for a plurality of complementary color pairs for each grayscale unit. It is therefore possible to perform an optimal image display, regardless of the grayscales to be reproduced.

BEST MODE FOR CARRYING OUT THE INVENTION

The present invention is described below by way of an example in which it is applied to a presentation system that uses a liquid-crystal projector, with reference to the accompanying drawings.

Overall System

Figure 1:
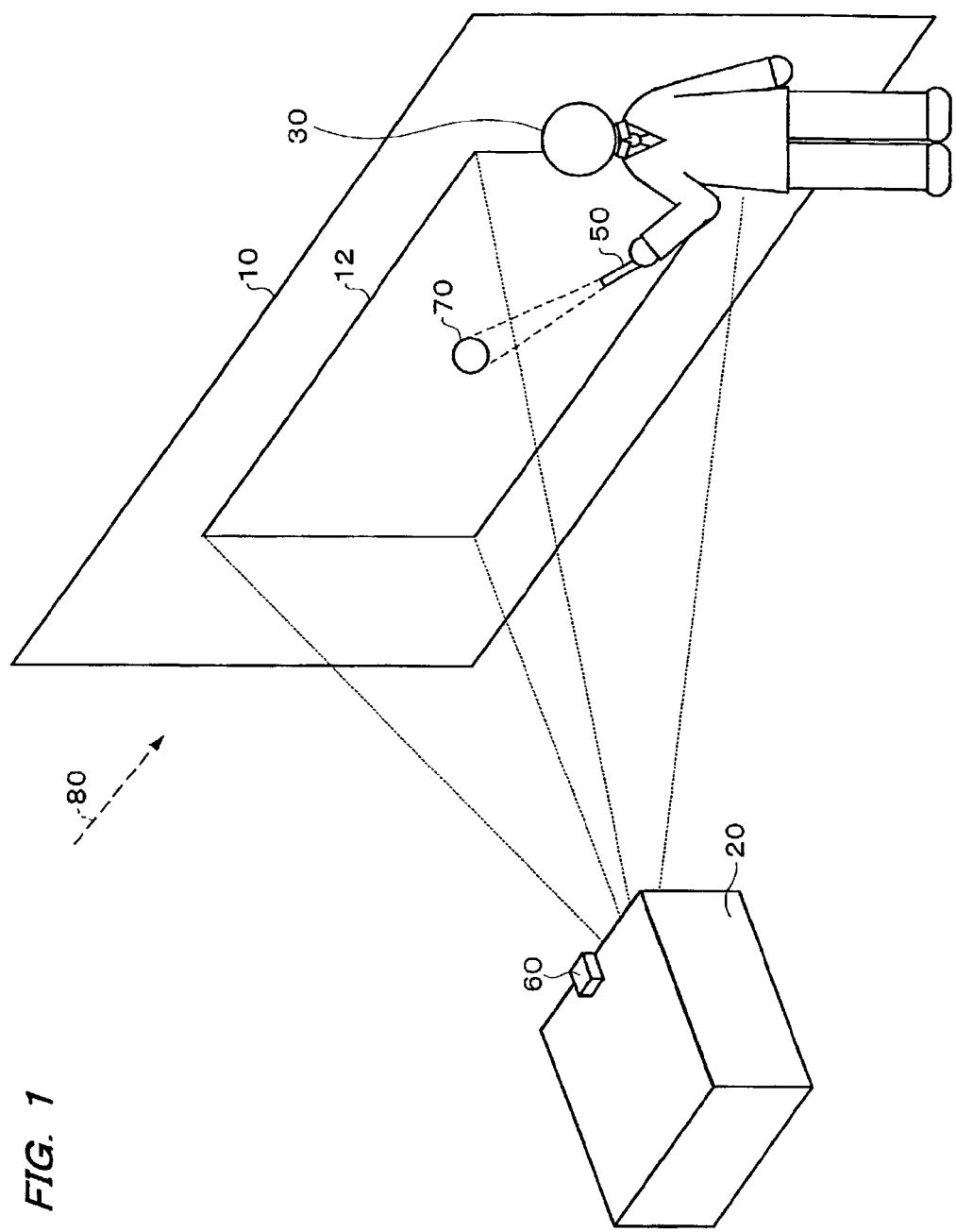
FIG. 1 is a schematic illustrative view of a presentation system using a laser pointer, in accordance with an example of this embodiment of the invention.

A schematic illustrative view of a presentation system that uses a laser pointer 50, in accordance with an example of this embodiment, is shown in FIG. 1.

A projector 20, which is provided substantially facing a screen 10, projects an image for a given presentation. A presenter 30 gives a presentation to an audience, while using a light spot 70 projected from the laser pointer 50 to point at a desired position of an image in an image display region 12, which is a display area on the screen.

During such a presentation, the way in which images on the image display region 12 are seen will vary greatly, depending on factors such as the type of the screen 10 and ambient light 80 When the same white is displayed, for example, the type of the screen 10 could make it seem to be white with a yellow cast or white with a blue cast. Similarly, differences in the ambient light 80 could make the same white appear to be a bright white or a dull white.

Recently, this type of projector 20 has become smaller and easy to transport. For that reason, it has become possible to perform presentations at a client's location, by way of example, but it is difficult to adjust colors to match the environment at the client's location and manual adjustment of colors at the client's location takes too much time.

Figure 2:
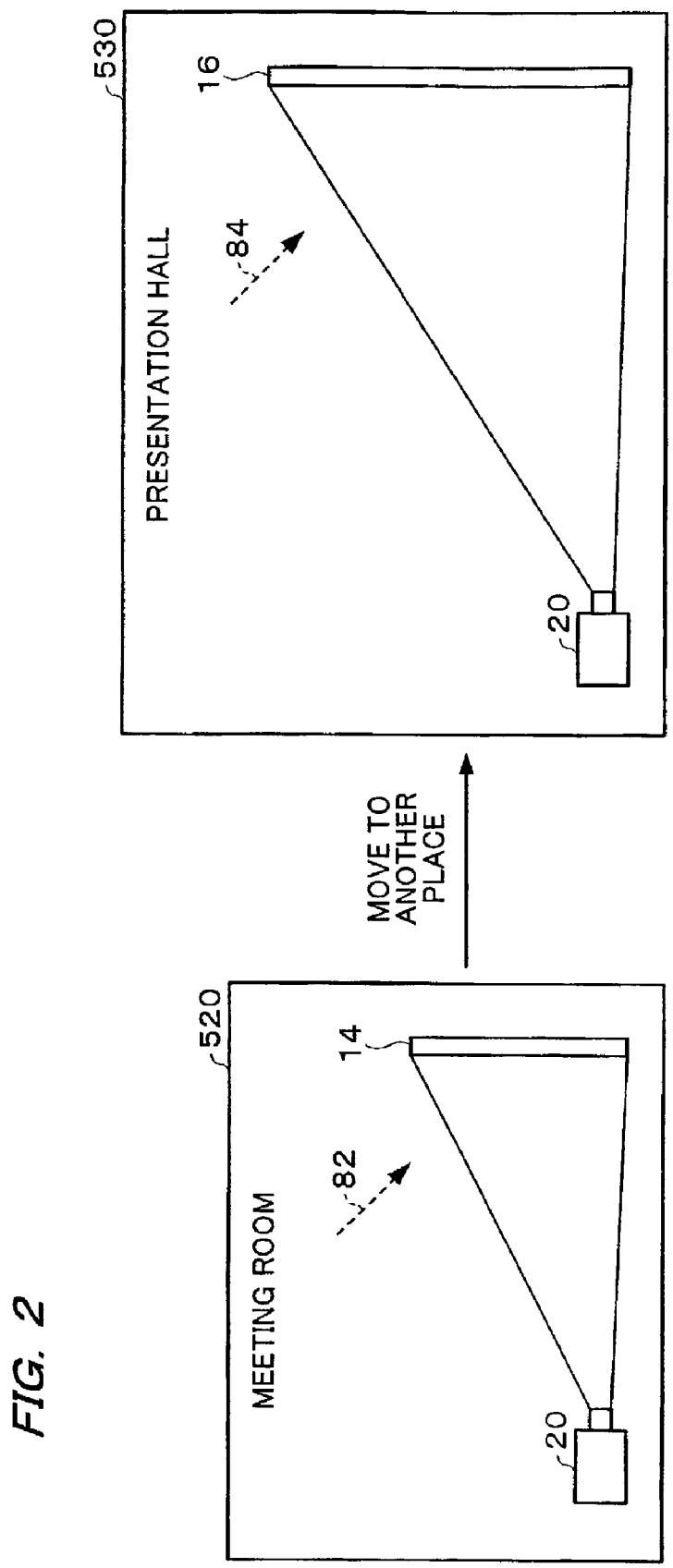
FIG. 2 is a schematic illustrative view of a presentation system using a portable projector.

A schematic illustrative view of a presentation system that uses a portable projector is shown in FIG. 2.

An image is projected towards a dedicated screen 14 in a meeting room 520 from the projector 20, within a visual environment in which there is ambient light 82 that is fluorescent light, as shown by way of example in FIG. 2. Assume that the way in which the image appears is adjusted in this test environment, then the system is moved from the meeting room 520 to the presentation hall 530 that is the actual environment, and the image is projected from the projector 20.

In the presentation hall 530, there is ambient light 84 consisting of both fluorescent light and external light, unlike in the meeting room 520, and the image is displayed by using a screen 16 that is of a different material from the screen 14.

For that reason, the way in which that image is seen in the presentation hall 530 will be different, even if the image has been adjusted in the meeting room 520, and it may even be impossible to obtain the presentation effect that was originally intended.

Figure 3:
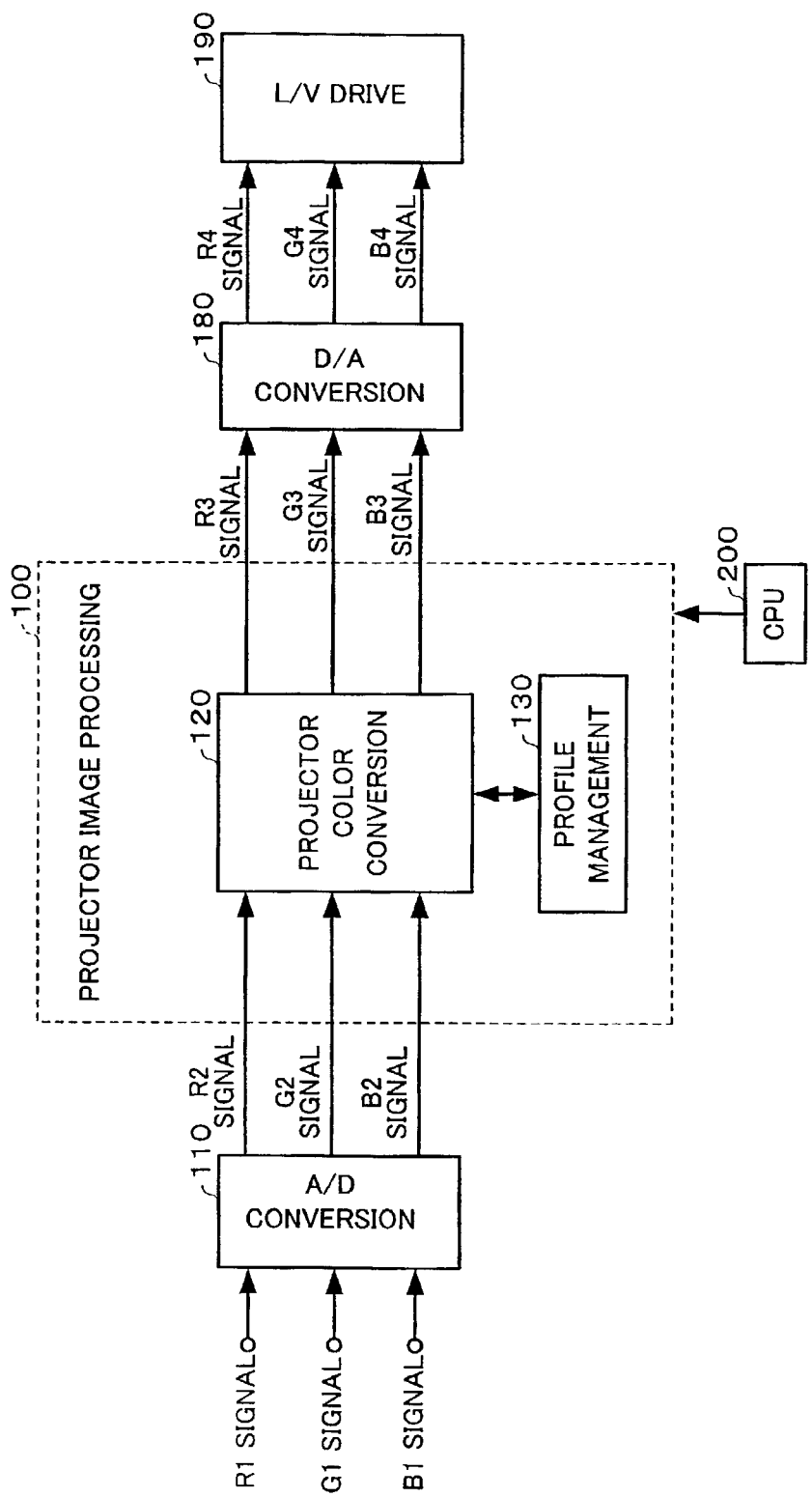
FIG. 3 is a functional block diagram of an image processing section within a conventional projector.

A functional block diagram of the image processing section within a conventional projector is shown in FIG. 3.

This conventional projector inputs an R1 signal, a G1 signal, and a B1 signal (which are RGB signals in analog format, sent from a PC or the like) to an A/D conversion section 110. A projector image processing section 100 performs color modification on an R2 signal, a G2 signal, and a B2 signal which have been converted into digital form by the A/D conversion section 110

An R3 signal, a G3 signal, and a B3 signal that have been subjected to the color conversion are input to a D/A conversion section 180. An R4 signal, a G4 signal, and a B4 signal that have been converted into analog form by the D/A conversion section 180 are input to a light valve (L/V) drive section 190 that is part of the image display means, to drive liquid-crystal light bulbs to project and display an image.

The projector image processing section 100, which is controlled by a CPU 200, comprises a projector color conversion section 120 and a profile management section 130.

The projector color conversion section 120 converts the RGB digital signals (the R2 signal, G2 signal, and B2 signal) into RGB digital signals (the R3 signal, G3 signal, and B3 signal), based on a projector input-output profile that is managed by the profile management section 130. Note that "profile" in this case refers to characteristic data.

In this manner, the conventional projector can only perform color modification based on an input-output profile that indicates input-output characteristics that are specific to that particular projector, so no consideration is paid to the visual environment in which the image is projected and displayed.

However, it is difficult to make the way in which colors are seen uniform, as described above, without taking the visual environment into account. The way in which colors are seen is determined by three factors: light, the reflection or transmission of light by objects, and vision.

This embodiment of the present invention implements an image display system that can reproduce the same colors regardless of the environment in which it is used, by detecting a visual environment that takes into consideration the light and the reflection or transmission of light by objects.

More specifically, the device is provided with a colored-light sensor 60 that functions as visual environment detection means for detecting the visual environment, as shown in FIG. 1, and visual environment information from the colored-light sensor 60 is input to the projector 20. The colored-light sensor 60 measures colored-light information (more specifically, RGB or XYZ tristimulus values) within the image display region 12 of the screen 10.

The projector 20 is provided with colored-light information processing means that converts the visual environment information into coordinate values within a given color space, and also obtains coordinate values that form complementary color pairs for the thus-converted coordinate values, based on coordinate values within the given color space of given colors within a given reference environment and the thus-converted coordinate values.

The projector 20 is also provided with correction means that corrects display input-output characteristic data that is used by means of displaying the image, based on the coordinate values that form the thus-obtained complementary color pairs.

The description now turns to the functional blocks of the image processing section of the projector 20, which comprises the above colored-light information processing means and correction means.

Figure 4:
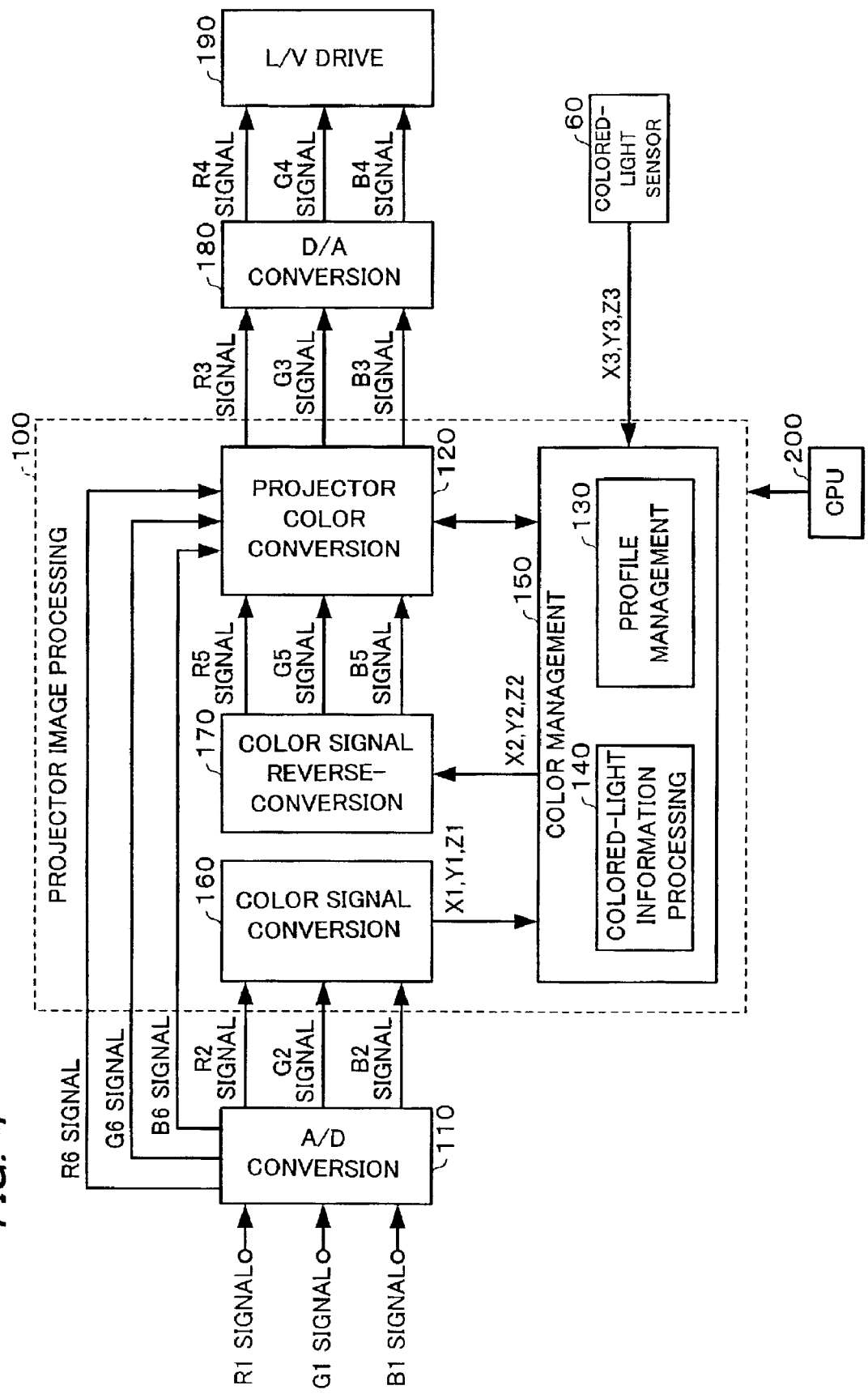
FIG. 4 is a functional block diagram of an image processing section within the projector in accordance with an example of this embodiment of the invention.

A functional block diagram of the image processing section within the projector 20 in accordance with an example of this embodiment of the invention is shown in FIG. 4.

The projector 20 inputs the R1 signal, the G1 signal, and the B1 signal (which form RGB signals in analog form, sent from a PC or the like) to the A/D conversion section 110, and uses the projector image processing section 100 to perform color conversion on the R2 signal, the G2 signal, and the B2 signal in digital form.

The projector 20 then inputs an R3 signal, a G3 signal, and a B3 signal that have been subjected to color conversion to the D/A conversion section 180, and an R4 signal, a G4 signal, and a B4 signal that have been converted into analog form are input to the light valve (L/V) drive section 190, to drive liquid-crystal light bulbs to project and display an image.

Up until this point, there is no difference from the configuration of the conventional projector. However, the projector image processing section 100 of the projector 20 in accordance with this embodiment of the invention also comprises a color signal conversion section 160, a color signal reverse-conversion section 170, a color management section 150, and the projector color conversion section 120.

The color signal conversion section 160 converts the digital RGB signals (R2 signal, G2 signal, and B2 signal) from the A/D conversion section 110 into XYZ values (X1, Y1, Z1). Note that the RGB signals are device-dependent colors that are modified by the input-output device, such as the projector 20, and the XYZ values are device-independent colors that are the same regardless of the device.

Note also that a method such as a matrix-conversion method using a 3×3 matrix can be used as the specific method for converting from the RGB digital signals to the XYZ values.

The color signal conversion section 160 outputs the thus-converted XYZ values (X1, Y1, Z1) to the color management section 150.

The color management section 150 takes the XYZ values (X1, Y1, Z1) that have been input from the color signal conversion section 160 and converts them into XYZ values (X2, Y2, Z2) that take into account the visual environment, based on a measured value from the colored-light sensor 60 that is the visual environment detection means.

The color management section 150 also comprises a colored-light information processing section 140 and the profile management section 130 that manages the above described input-output profile for the projector 20.

The colored-light information processing section 140 performs conversions into coordinate values within a Lab space that take into account the actual visual environment information, to obtain coordinate values for complementary color pairs for the thus-converted coordinate values, based on coordinate values within the Lab space of white within the given reference environment and the thus-converted coordinate values. Note that "complementary color pair" refers to a pair of colors that form grey when mixed together.

The colored-light information processing section 140 converts the XYZ values (X1, Y1, Z1) input from the color signal conversion section 160 into XYZ values (X2, Y2, Z2) that take into account the visual environment, based on the measured value from the colored-light sensor 60.

The profile management section 130 functions as the above described correction means and creates the input-output profiles for the RGB signals of the projector 20. The profile management section 130 also manages the RGB input-output characteristic of the projector 20, using the thus-created input-output profiles for the RGB signals.

The color signal reverse-conversion section 170 performs a reverse conversion on the XYZ values (X2, Y2, Z2) from the colored-light information processing section 140 to convert them into RGB digital signals (an R5 signal, a G5 signal, and a B5 signal), using a reverse matrix of the above-described matrix of the color signal conversion section 160.

The projector color conversion section 120 takes the RGB digital signals (the R5 signal, G5 signal, and B5 signal) from the color signal reverse-conversion section 170 and converts them into the RGB digital signals (the R3 signal, G3 signal, and B3 signal) for projector output, with reference to the projector profile managed by the profile management section 130.

The projector image processing section 100 controlled by the CPU 200 comprises the projector color conversion section 120 and the profile management section 130.

The projector color conversion section 120 takes the RGB digital signals (the R6 signal, G6 signal, and B6 signal) from the A/D conversion section 110 and converts them into the RGB digital signals for projector output (the R3 signal, G3 signal, and B3 signal), based on the input-output profiles for the RGB signals that are managed by the profile management section 130.

The RGB digital signal for projector output that are output from the projector color conversion section 120 are converted into the RGB analog signals (the R4 signal, G4 signal, and B4 signal) by the D/A conversion section 180, and liquid-crystal light bulb are driven by the L/V drive section 190 to project and display an image, based on those RGB analog signals.

This ensures that the projector 20 of this embodiment of the invention can project and display an image by considering the visual environment.

In other words, the projector 20 can display an image that is suitable for the environment during the display, by correcting input-output characteristic data for the display used by the image display means, based on coordinate values that take account of environmental information and coordinate values forming complementary color pairs. This makes it possible for the projector 20 to display the same image, regardless of the applied environment, by overcoming any differences in the display environment. It therefore becomes possible for the projector 20 to reproduce substantially the same colors within a short time-frame at a plurality of different locations.

The description now turns to how the components such as the color management section 150 work, taking an actual presentation as an example and using flowcharts.

Figure 5:
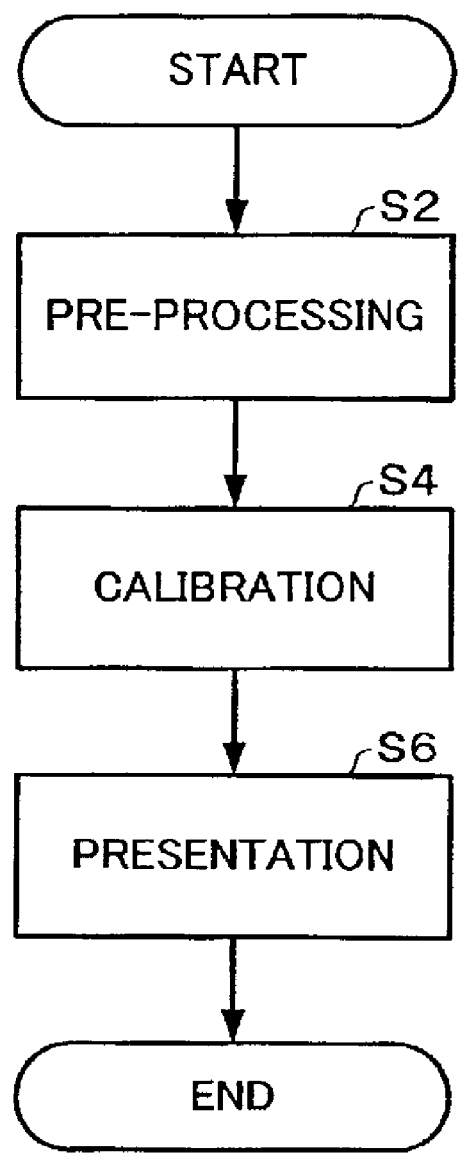
FIG. 5 is a flowchart showing the flow of an entire presentation in accordance with an example of this embodiment.

A flowchart showing the flow of an entire presentation in accordance with an example of this embodiment of the invention is shown in FIG. 5.

When the projector 20 is used for giving a presentation, the projector 20 performs preprocessing such as that for creating an input-output profile, using the profile management section 130 (step S2).

The projector 20 performs calibration (correction) by means such as projecting a calibration image onto the screen 10, to adjust for the visual environment (step S4).

The presenter 30 gives the presentation after the calibration has ended (step S6).

More specifically, the projector 20 projects a white image towards the screen 10 within a reference environment such as an image work environment. The colored-light sensor 60 that is the visual environment detection means measures colored-light information (more precisely, RGB or XYZ tristimulus values) of the image display region 12 on which the white image is displayed.

The projector 20 inputs visual environment information that indicates the colored-light information measured by the colored-light sensor 60 and creates RGB input-output profiles that obtain any desired gamma values and color temperatures for post-processing. Ideal gamma values and color temperatures are not measured by the colored-light sensor 60; they may be set as default values that are input beforehand.

The projector 20 projects white image towards the screen 10 in the actual presentation environment. The colored-light sensor 60 measures colored-light information for the image display region 12 on which the white image is displayed.

Visual environment information that indicated the colored-light information measured by the colored-light sensor 60 is input to the projector 20 and RGB input-output profiles that obtain any desired gamma values and color temperatures after post-processing are corrected and regenerated.

The projector 20 projects and displays the actual presentation image in a state in which the RGB input-output profiles have been corrected.

The description now turns to details of the sequence from pre-processing (step S2) to the presentation (step S6).

Figure 6:
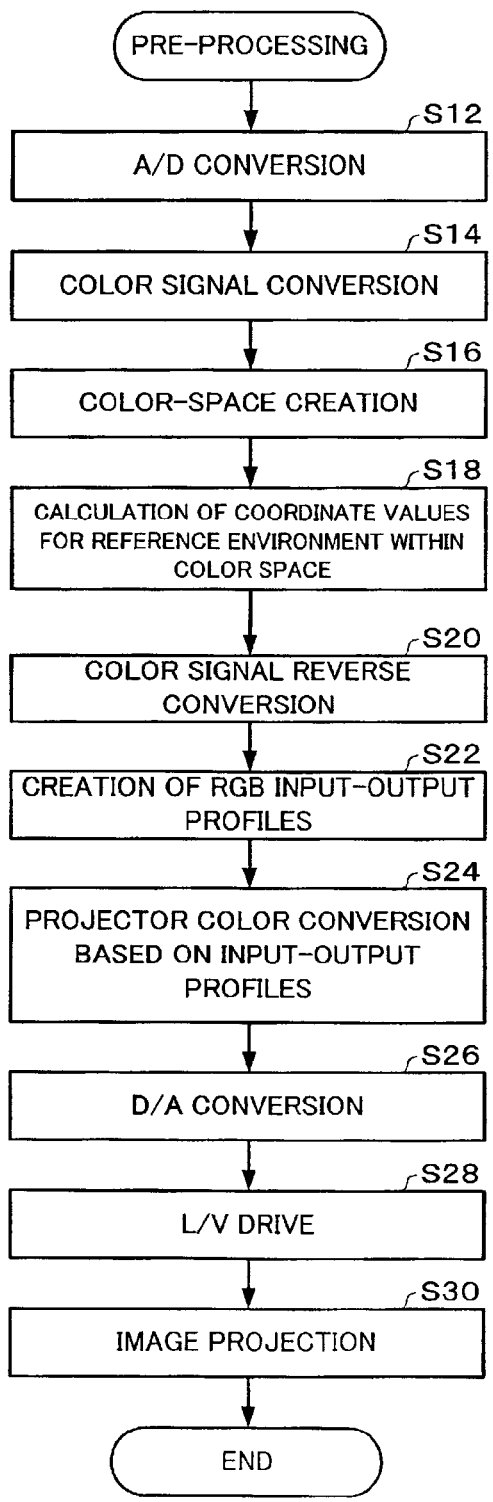
FIG. 6 is a flowchart showing the flow of pre-processing in accordance with an example of this embodiment.

A flowchart showing the flow of pre-processing in accordance with an example of this embodiment of the invention is shown in FIG. 6.

For the pre-processing (step S2), the projector image processing section 100 first takes the analog signals (the R1 signal, G1 signal, and B1 signal) for the pre-processing reference white image and converts them into digital signals (the R2 signal, G2 signal, and B2 signal) (step S12).

The color signal conversion section 160 converts those digital signals into XYZ values (X1, Y1, Z1) and outputs them to the color management section 150 (step S14).

The colored-light information processing section 140 within the color management section 150 creates the color space (Lab space), based on those XYZ values (X1, Y1, Z1) (step S16). The colored-light information processing section 140 then calculates reference white coordinate values within that color space (step S18).

As described above, the colored-light sensor 60 measures XYZ values (X3, Y3, Z3) that form colored-light information for the image display region 12 in which the white image is displayed, and sends the projector 20 visual environment information (X3, Y3, Z3) that comprises those measurement results.

The colored-light information processing section 140 takes the XYZ values (X1, Y1, Z1) that have been input from the color signal conversion section 160 and converts them into XYZ values (X2, Y2, Z2) that take the visual environment into account, based on the measured values from the colored-light sensor 60.

Note that the projector 20 actually projects and displays the white image in given grayscale units, the colored-light sensor 60 measures XYZ values (X3, Y3, Z3) for the white image for each of those grayscale units, and the colored-light information processing section 140 generates a color space (Lab space) based on the XYZ values (X1, Y1, Z1) for the white images of all the grayscales.

The color signal reverse-conversion section 170 takes the XYZ values (X2, Y2, Z2) from the colored-light information processing section 140 and performs a matrix reverse-conversion thereon to obtain RGB digital signals (the R5 signal, G5 signal, and B5 signal), using the reverse matrix of the above-described matrix of the color signal conversion section 160 (step S20).

The profile management section 130 creates input-output profiles for the RGB signals of the projector 20, based on the measured values from the colored-light sensor 60 (step S22). This creates input-output profiles for the reference environment.

The projector color conversion section 120 converts the RGB digital signals (the R5 signal, G5 signal, and B5 signal) from the color signal reverse-conversion section 170 into the RGB digital signals (R3 signal, G3 signal, and B3 signal) for projector output (step S24).

The D/A conversion section 180 takes the RGB digital signals for projector output that are output from the projector color conversion section 120 and converts them into RGB analog signals (the R4 signal, G4 signal, and B4 signal) (step S26).

The L/V drive section 190 drives liquid-crystal light bulbs, based on those RGB analog signals (step S28), to project and display the white image (step S30).

In this manner, the projector 20 creates a color space, coordinate values in the color space under the reference environment, and input-output profiles for the RGB signals of the projector 20, during the pre-processing (step S2).

The calibration (step S4) will now be described.

Figure 7:
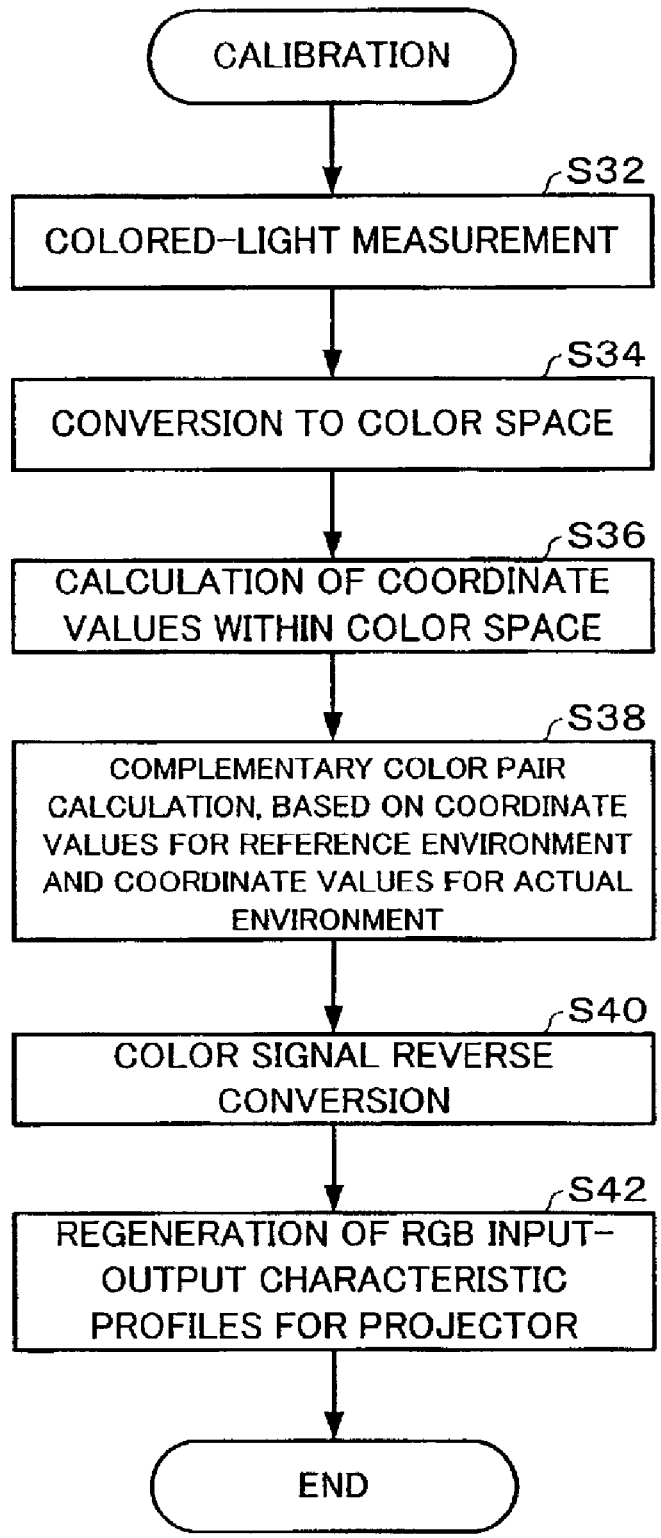
FIG. 7 is a flowchart showing the flow of calibration in accordance with an example of this embodiment.

A flowchart showing the flow of calibration in accordance with an example of this embodiment of the invention is shown in FIG. 7.

The presenter 30 performs the calibration before giving the presentation at the location where the presentation will be given.

During the calibration (step S4), the projector 20 first projects and displays onto the screen 10 the white image used by the reference environment, in order to detect the visual environment at the location at which the presentation is actually held. The colored-light sensor 60 measures colored-light information for the image display region 12 in which the white image is displayed (step S32).

Since this colored-light information is expressed as XYZ values, the colored-light information processing section 140 converts the XYZ values into Lab values (Lab space, using general-purpose equations (step S34).

The colored-light information processing section 140 measures coordinate values within the color space (Lab space), based on the measured values from the colored-light sensor 60 (step S36).

The colored-light information processing section 140 calculates coordinate values forming complementary color pairs, based on the coordinate values for the reference environment obtained in step S18 and coordinate values for the actual visual environment (step S38).

The method used for obtaining the coordinate values forming the complementary color pairs may be one in which an inverse vector is obtained of a bound vector that indicates the coordinate position of coordinate values of white within the actual presentation environment, by way of example.

Figure 9:
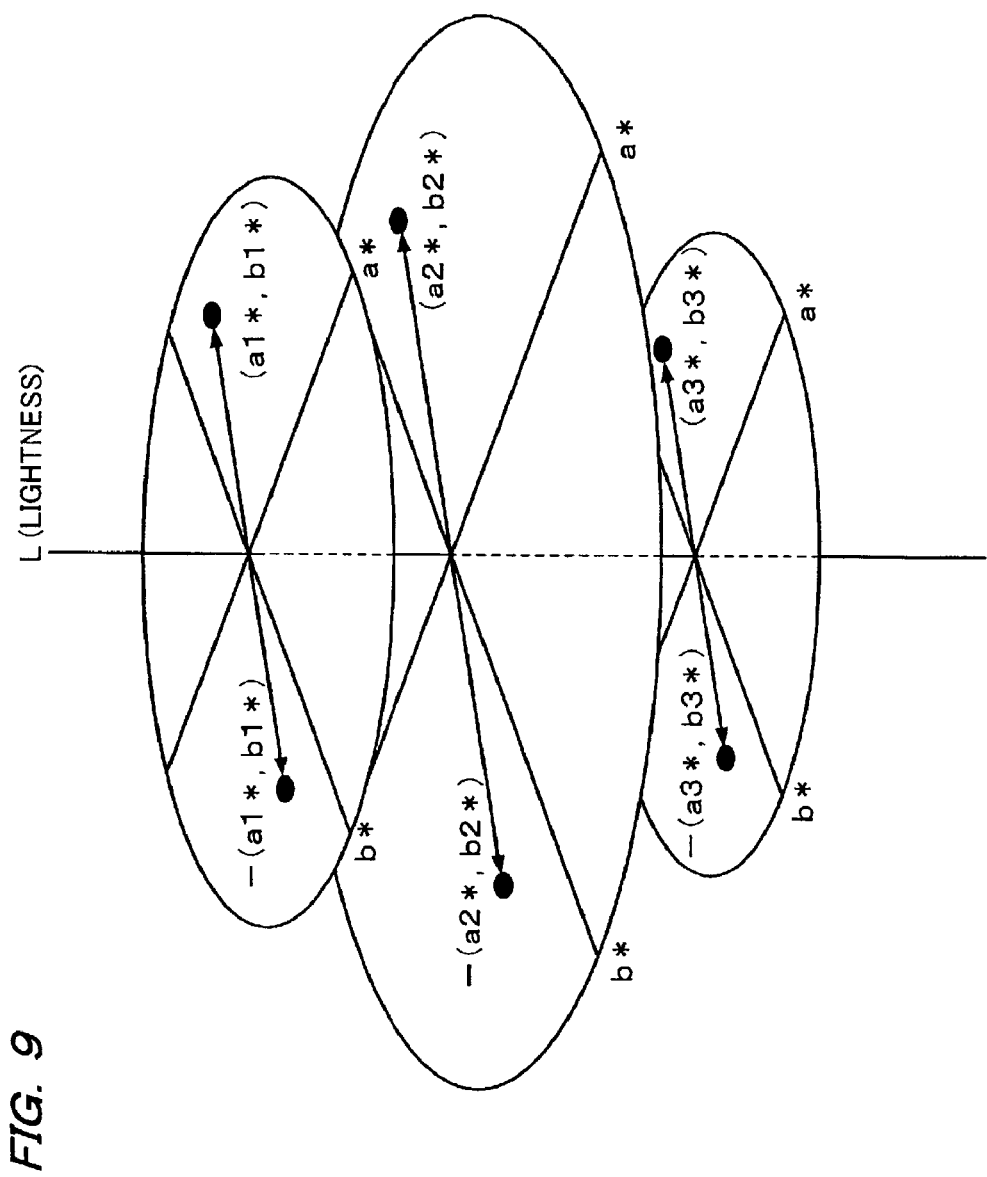
FIG. 9 is a schematic view illustrating the concept of an inverse vector within a Lab space.

A schematic view showing the concept of inverse vectors within the Lab space is shown in FIG. 9.

As shown in FIG. 9, the Lab space has a longitudinal axis L (brightness) and a plurality of a*b* planes along the L axis. Assume that the coordinate values for the white value for the actual presentation environment are (a1*, b1*) within a given a*b* plane, by way of example.

In such a case, the coordinate values (a1*, b1*) can be defined as the origin within that a*b* plane, in other words, as a bound vector within the point where that a*b* plane intersects the L axis. Note that the term "vector" in this case refers to a vector having magnitude and direction.

By obtaining a inverse vector of that bound vector, it is possible to obtain coordinate values (a1*, b1*) and coordinate values (−a1*, −b1*) that form a complementary color pair therewith.

In other words, white is a point on the L axis in the reference environment, but it is displaced by (a1*, b1*) from the origin on the L axis in the actual environment.

The profile management section 130 can therefore position the coordinate values on the L axis for the white measured in the actual environment and thus reproduce colors from the reference environment, even in the actual environment, by using this inverse vector for color correction.

The colored-light information processing section 140 also outputs XYZ values (x2, Y2, Z2) obtained by correcting the XYZ values (X1, Y1, Z1), based on these coordinate values that form complementary color pairs.

The color signal reverse-conversion section 170 performs a matrix reverse-conversion on the XYZ values (X2, Y2, Z2) from the colored-light information processing section 140 to obtain the RGB digital signals (the R5 signal, G5 signal, and B5 signal) (step S40).

The profile management section 130 regenerates the previously created input-output profiles for the RGB signals from the coordinate values of the complementary color pairs (step S42).

In practice, the projector 20 performs this color correction for each given grayscale unit, such as 16 grayscales or 32 grayscales, within each of a plurality of a*b* planes on the L axis.

Each input-output profile is used in gamma correction, in practice.

Figure 10A:
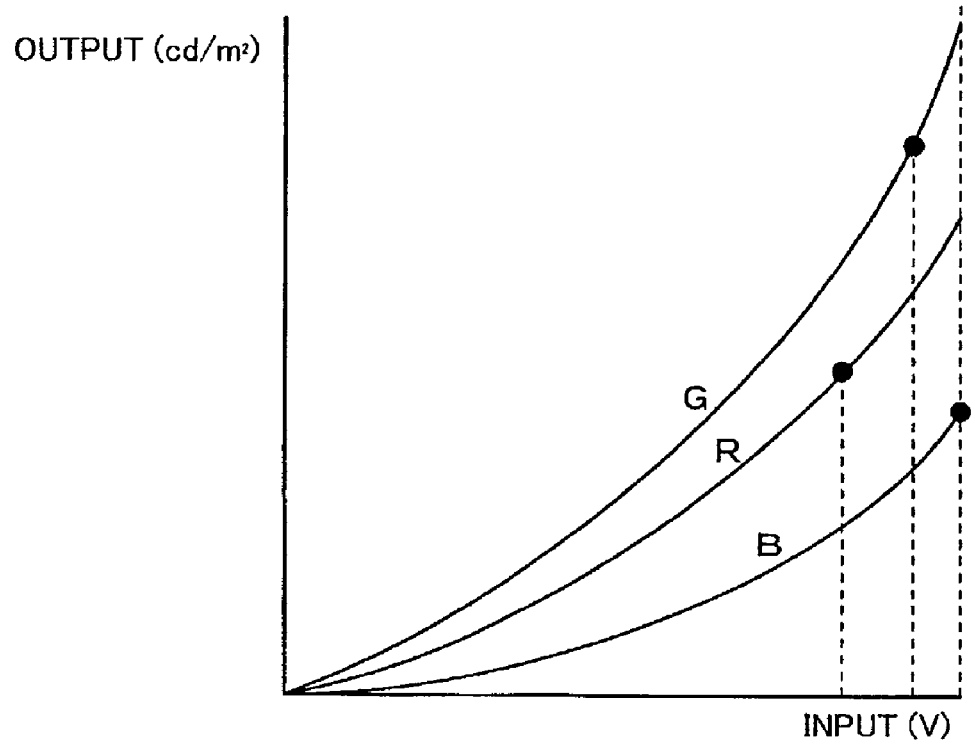
FIG. 10A shows RGB input-output characteristics relating to ideal light and FIG. 10B shows the RGB input-output characteristic of FIG. 10A after correction.

The RGB signals increase in brightness, in other words output (cd/m$^2$), as the voltage, in other words the value of the input voltage, increases, as shown in FIG. 10A.

RGB input-output characteristics relating to ideal light are shown in FIG. 10A. It is therefore possible for the projector 20 to achieve an ideal white in accordance with the RGB input-output characteristics with no black spots (●), under an ideal environment that is not affected by factors such as the ambient light and the screen 10, depending on colored-light information from the colored-light sensor 60.

However, the colored-light information of the projector 20 is often affected by factors such as ambient light and the screen 10 in practice. In the example shown in FIG. 10A, color reproduction is strongly affected by red and green on the screen 10 if there is no white correction by the projector 20.

In this state, even the ideal white light that is output from the projector 20 will be reproduced on the screen 10 with a yellowish tinge. In this case, in order to correct for the effects of factors such as the ambient light and the screen 10 comprised within the colored-light information of the projector 20, the yellowish white light obtained by a deterioration of output due to the amount of correction thereof, as shown by the positions of the black spots of the R and G signals from among the three RGB input-output signals, can be corrected to the ideal while light that is output from the projector 20.

Figure 10B:
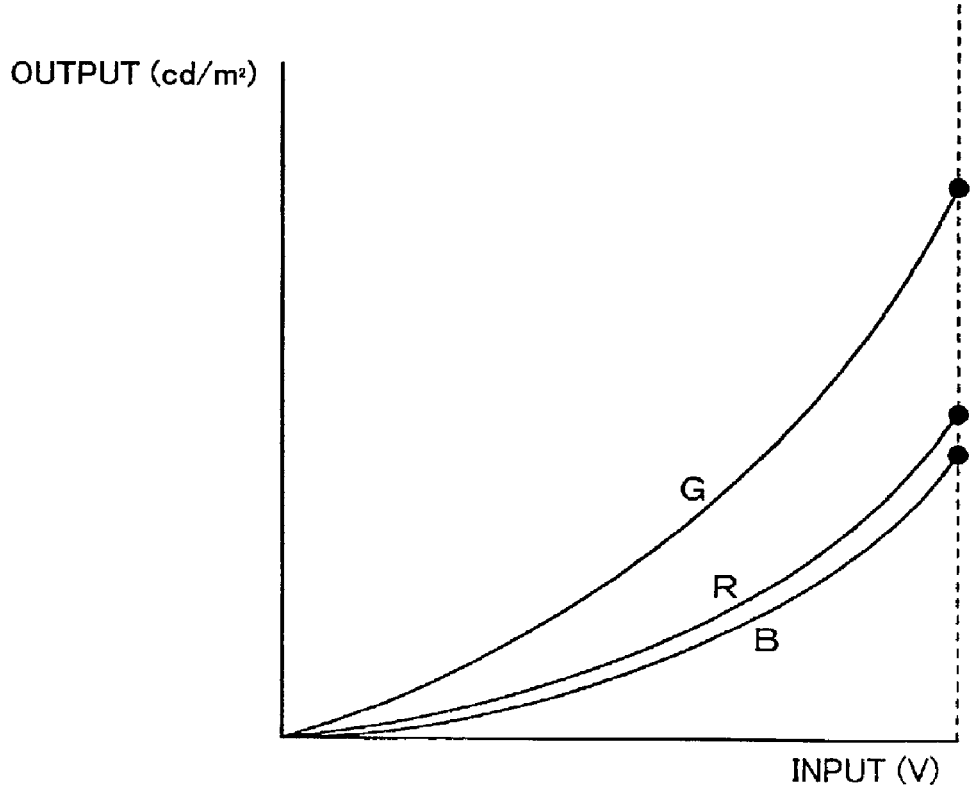

FIG. 10B shows the reproduction of the R and G curves when black spots shown in FIG. 10A are shifted as far as the axis of the maximum value of unmodified input (the line indicating the right-most line in FIG. 10A). Note that the R curve, G curve, and B curve of the post-correction input-output signal characteristics for each RGB grayscale of FIG. 10B are obtained from Equations (1) to (3) below. The correction coefficients KR, KG, and KB are obtained from Equations (4) to (6).

$$R \text{ signal (bit)} = KR \times \text{pre-correction input signal} \quad (1)$$

$$G \text{ signal (bit)} = KG \times \text{pre-correction input signal} \quad (2)$$

$$B \text{ signal (bit)} = KB \times \text{pre-correction input signal} \quad (3)$$

$$KR = \text{post-correction } R \text{ maximum input value}/255 \quad (4)$$

$$KG = \text{post-correction } G \text{ maximum input value}/255 \quad (5)$$

$$KB = \text{post-correction } B \text{ maximum input value}/255 \quad (6)$$

Figure 12:
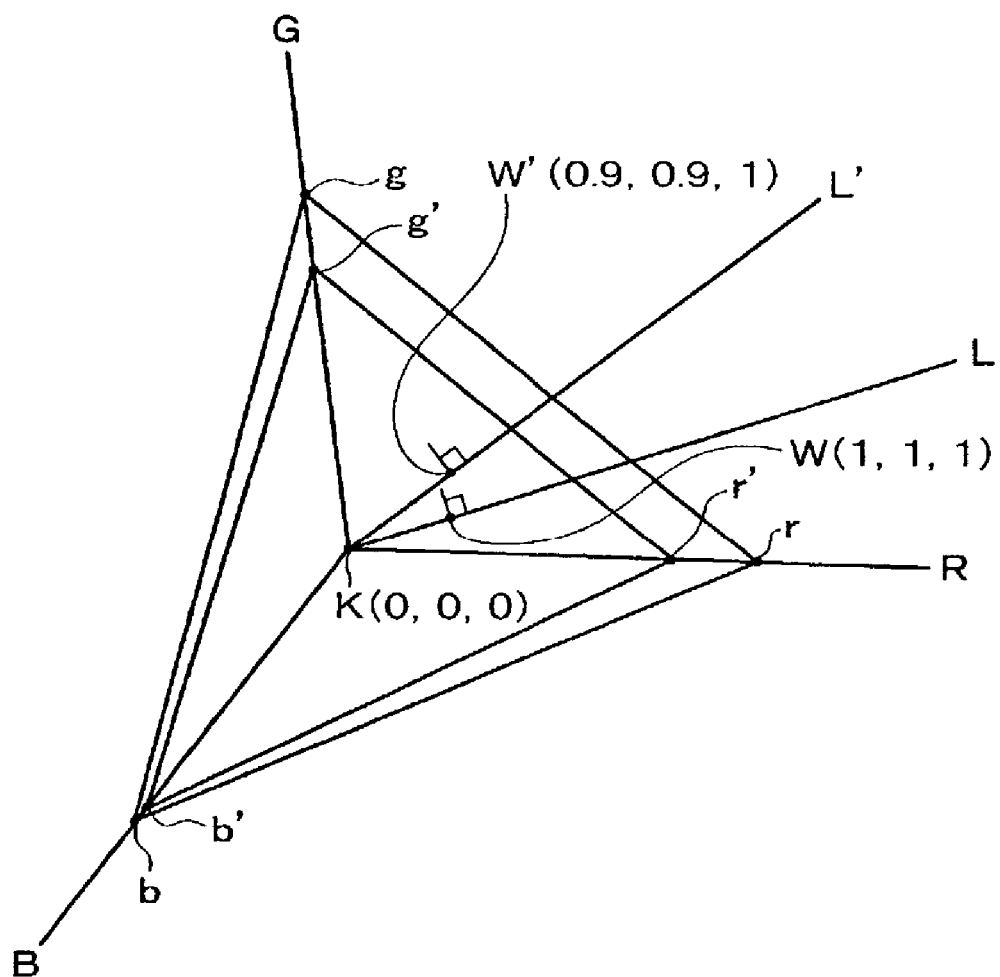
FIG. 12 is a schematic view of pre-correction and post-correction states of the RGB input-output characteristic.

A schematic view of the pre-correction and post-correction state of an RGB input-output characteristic is shown in FIG. 12.

In the pre-correction color triangle rgb, K(0, 0, 0), in other words, the point at which the brightness axis L that passes through black intersects the color triangle rgb, indicates white.

The color triangle rgb can be modified to another color triangle r'g'b', by way of example, by performing the above described correction of inverse vectors over the entire color triangle rgb. The color triangle r'g'b' assumes a shape in which white, which is the point at which the brightness axis L that passes through black intersects the color triangle r'g'b', becomes W' (0.9, 0.9, 1), fairly close to the K (0, 0, 0) of the color triangle rgb.

In this manner, it is possible to create an input-output profile under the actual usage environment by calibration (step S4), thus enabling appropriate gamma correction.

The description now turns to the actual presentation (step S6) after this calibration.

Figure 8:
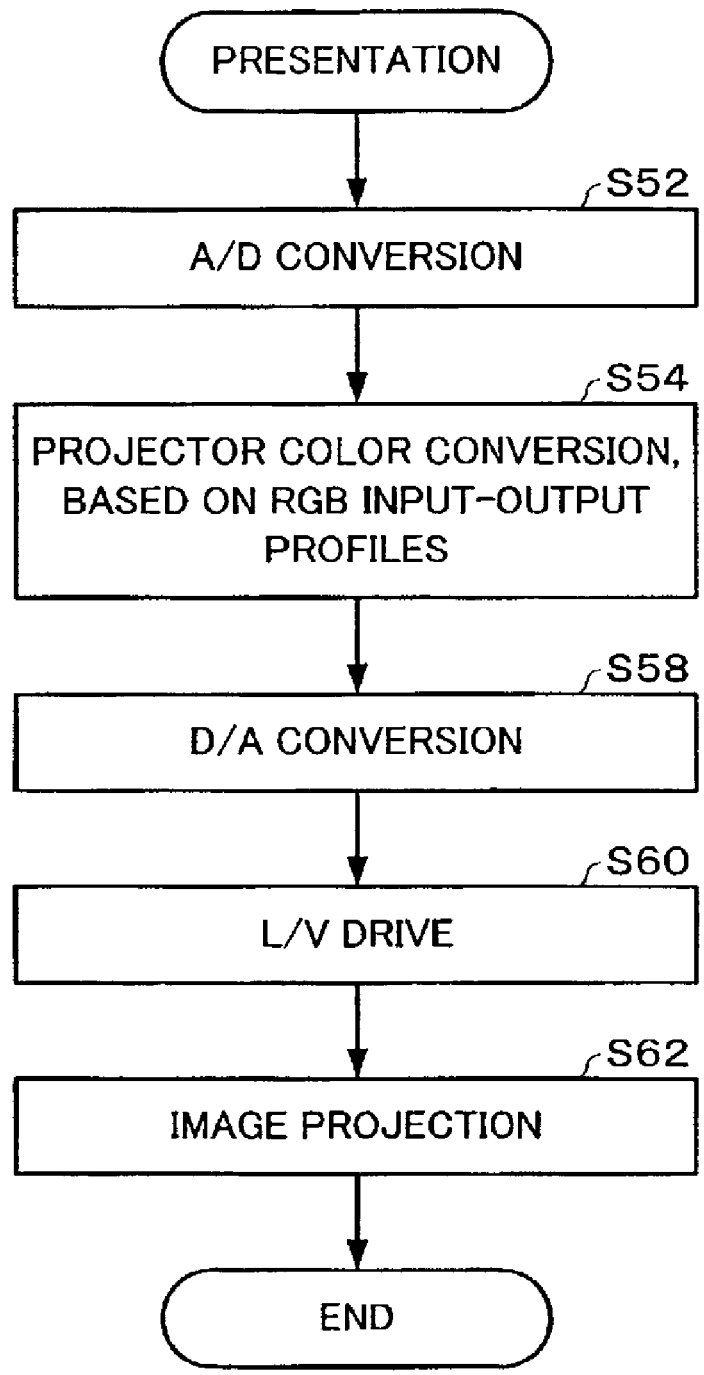
FIG. 8 is a flowchart showing the flow of the presentation in accordance with an example of this embodiment.

A flowchart of the flow of the presentation in accordance with this embodiment of the invention is shown in FIG. 8.

At the stage at which calibration is performed, RGB input-output profiles corresponding to the visual environment have been created. In this state, the projector 20 projects and displays the usual presentation image.

During the presentation (step S6), the A/D conversion section 110 first takes the analog signals (the R1 signal, G1 signal, and B1 signal) for the presentation image and converts them into digital signals (the R6 signal, G6 signal, and B6 signal) (step S52).

The projector color conversion section 120 takes the digital signals (the R6 signal, G6 signal, and B6 signal) and converts them into digital RGB signals (the R3 signal, G3 signal, and B3 signal) for the projector 20, based on the adjusted RGB input-output profiles (step S54).

The D/A conversion section 180 takes the RGB digital signals for projector output that are output from the projector color conversion section 120 and converts them into RGB analog signals (the R4 signal, G4 signal, and B4 signal) (step S58).

The L/V drive section 190 drives the liquid-crystal light bulbs on the basis of those RGB analog signals (step S60), to project and display the presentation image (step S62).

As described above, the projector 20 corrects the input-output profiles to take the visual environment into account. This makes it possible to reproduce substantially the same image, regardless of the environment in which the projector 20 is used.

The correction can be done easily and rapidly, by using complementary color pair during the correction. In particular, it is possible to remove the influence of ambient light that affects the ideal colored light, and thus obtain an ideal white balance, by correcting the input-output characteristic data for each one of a number of grayscales, based on coordinate values forming complementary color pairs.

Hardware

The description now turns to the hardware configuration of the above-described projector 20.

Figure 13:
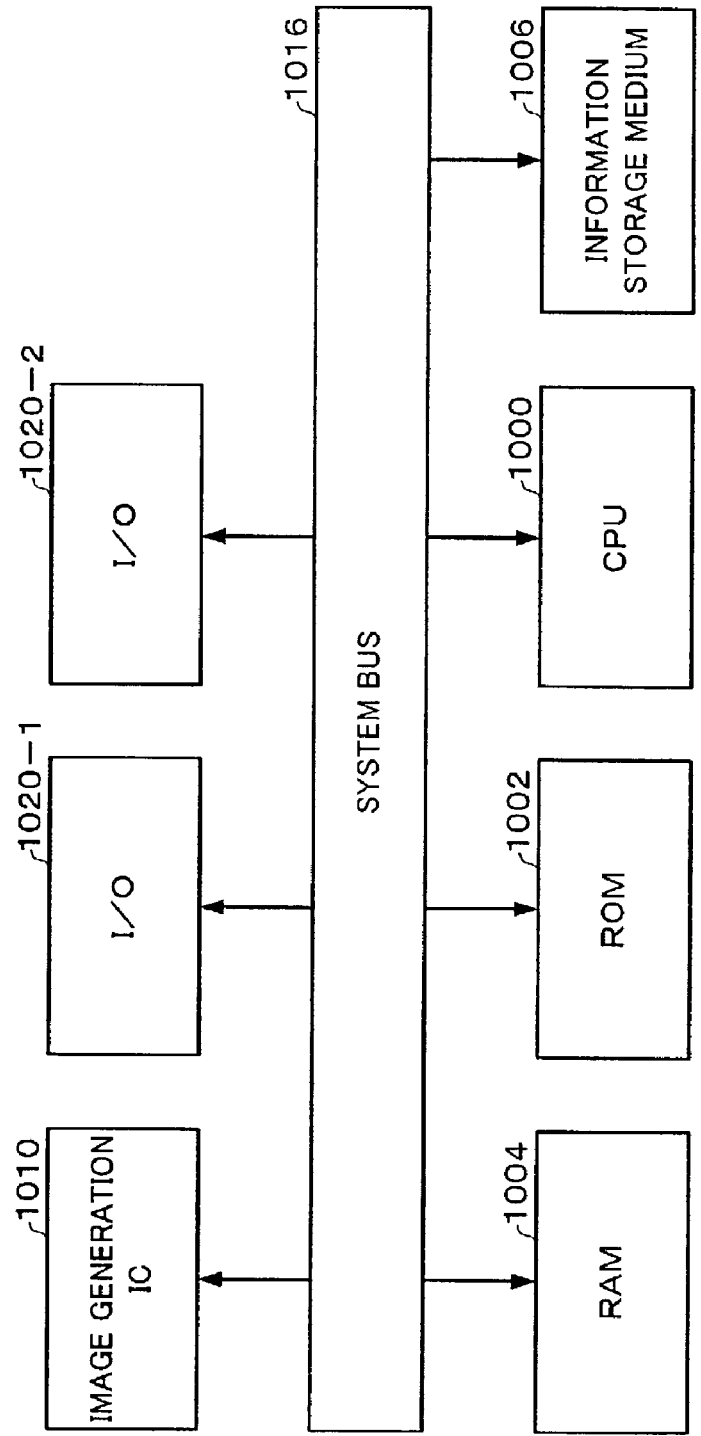
FIG. 13 is illustrative of the hardware configuration of a projector in accordance with an example of this embodiment.

An illustrative view of the hardware configuration of the projector 20 relating to an example of this embodiment is shown in FIG. 13.

In the device shown in this figure, a CPU 1000, ROM 1002, RAM 1004, an information storage medium 1006, an image generation IC 1010, and input-output (I/O) ports 1020-1 and 1020-2 are connected together by a system bus 1016 in such a manner that data can be mutually transferred therebetween. Components such as the colored-light sensor 60 and a PC are connected through the I/O ports 1020-1 and 1020-2.

The information storage medium 1006 is designed to store information such as a program and image data.

The CPU 1000 controls the entire device and performs various types of data processing, in accordance with the program stored in the information storage medium 1006 and a program stored in the ROM 1002. The RAM 1004 is storage means that is used as a work area for the CPU 1000, and given data for the information storage medium 1006 and the ROM 1002, as well as calculation results for the CPU 1000, are contained therein. A data structure having the logical configuration for implementing this embodiment of the present invention is constructed within the RAM 1004 or the information storage medium 1006.

The various processes described with reference to FIGS. 1 to 12 are implemented by the information storage medium 1006 that contains programs for performing those processes, together with components such as the CPU 1000 and the image generation IC 1010 that operate in accordance with those programs. Note that the processing performed by the image generation IC 1010 and other components may be implemented in a software manner by the CPU 1000 or an ordinary DSP.

Means such as a CD-ROM, DVD-ROM, ROM, or RAM can be used as the information storage medium 1006, and either a direct method or an indirect method may be used for reading out that information.

Instead of the information storage medium 1006, it is also possible to implement the above-described functions by downloading a program for implementing those functions from a host device or the like, through a transfer path. In other words, information for implementing the above-described functions may be embodied over carrier waves.

Modification

Note that the applications of the present invention are not limited to the embodiments described herein, and thus various modifications are possible, as described below.

In the example described with reference to FIG. 9, an inverse vector was used to obtain coordinate values that form a complementary color pair, but methods other than this inverse vector method could also be used. For example, it is possible to use an externally dividing point to obtain the coordinate values forming a complementary color pair.

Figure 11:
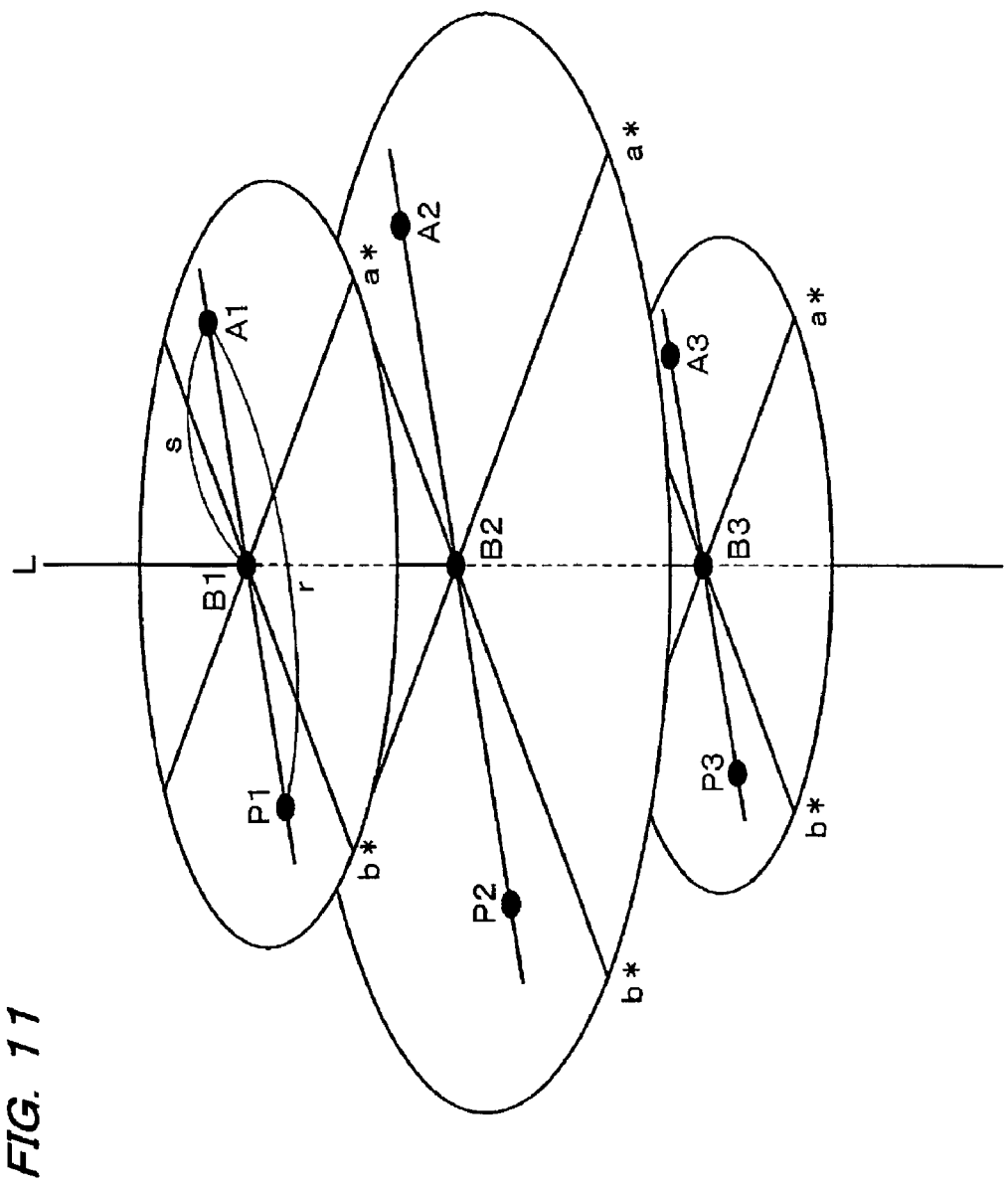
FIG. 11 is a schematic view illustrating the concept of an externally dividing point in the Lab space.

A schematic view illustrating the concept of an externally dividing point in the Lab space is shown in FIG. 11.

In a similar manner to the example of FIG. 9, assume that the coordinate values in a given a*b* plane of white in the presentation environment are A1 (a1, b1), the coordinate values of the intersection of the L axis with that plane are B1 (a2, b2), and the coordinate values of the complementary color pair to be obtained are P1 (a3, b3), by way of example. If the distance from A1 to P1 is r and the distance from A1 to B1 is s, r=2 s and, since the coordinate values of each of A1 and B1 are known, the distance s can be obtained.

If the externally dividing point method is used in this case, P1 (a3, b3) can be obtained from the following equations:

$$a3 = (-s \times a1 + 2s \times a2)/(2s-s) = -a1 + 2 \times a2 \quad (7)$$

$$b3 = (-s \times b1 + 2s \times b2)/(2s-s) = -b1 + 2 \times b2 \quad (8)$$

In this manner, it is possible to use an externally dividing point to obtain the coordinate values that form a complementary color pair.

The present invention can also be applied to presentations in which images are displayed by a display means other than a projection means such as a projector. Apart from a liquid-crystal projector, this display means may be a projector using a digital micromirror device (DMD), a cathode ray tube (CRT), a plasma display panel (PDP), a field emission device (FED), an electro-luminescence (EL) device, or a direct-view type of liquid crystal display device, by way of example. Note that DMD is a tradename registered by Texas Instruments Inc., of the US.

The functions of the above-described projector image processing section 100 may be implemented by a single device (such as the projector 20) or they may be implemented by a plurality of processing devices (such as the projector 20 and a PC).

The means for detecting the visual environment is not limited to the colored-light sensor 60 that measures XYZ values; various other types of visual environment detection means may be used therefor. For example, a luminance sensor that measures the luminance value of the display region, a colored-light sensor that measures the RGB values of the display region, or a chromaticity sensor that measures chromaticity of the display region may be used as the visual environment detection means.

Note that the "visual environment" in this case refers to factors such as the ambient light (such as lighting or natural light) and the object on which the image is displayed (such as a display, wall surface, or screen. Note also that the above-described screen 10 may be of a reflective type or a transmissive type. If the screen is of a transmissive type, it is desirable that a sensor that scans the screen directly is used as the colored-light sensor.

Although the color space in the above embodiment was described as being a Lab space, it is equally possible to apply another space instead, such as a L*u*v* space, L*C*h space, U*V*W* space, or xyY (or Yxy) space.

In addition, the embodiments described above related to examples of the use of a front-projection type of projector, but the present invention can also be applied to a rear-projection type of projector.

The invention claimed is:

1. An image display system of environment-compliant type that corrects a color of an image and displays the image, based on visual environment information generated by visual environment detection section that detects a visual environment in a display region of the image, the image display system comprising:
    a colored-light information processing section that converts a given color within the visual environment information into a coordinate value within a given color space, and obtains a coordinate value forming a complementary color pair with the converted coordinate value, based on a coordinate value within the given color space of the given color within a given reference environment and the converted coordinate value; and
    a correction section that corrects input-output characteristic data for display that is used by a display section to display the image, based on the obtained coordinate value forming the complementary color pair, the complementary color pair comprising colors forming gray when mixed together with the converted coordinate value within the visual environment.

2. The image display system as defined by claim 1, the colored-light information processing section obtaining an inverse vector of a bound vector that indicates a coordinate position of the converted coordinate value within the color space, as the coordinate value forming the complementary color pair, and the correction section correcting the input-output characteristic data, using the obtained inverse vector as a correction value.

3. The image display system as defined by claim 2, the correction section performing gamma correction as correction of the input-output characteristic data, based on the coordinate value forming the complementary color pair.

4. The image display system as defined by claim 3, the colored-light information processing section obtaining coordinate values of a plurality of complementary color pairs for each given grayscale unit.

5. The image display system as defined by claim 4, the visual environment detection section comprising a device that detects the visual environment by measuring at least ambient light.

6. A presentation system of environment-compliant type that corrects a color of a presentation image and displays the presentation image, adapting to a visual environment, the presentation system comprising:
   a visual environment detection section that detects the visual environment within a display region of the presentation image, and creates visual environment information;
   a colored-light information processing section that converts the visual environment information into a coordinate value within a given color space, and obtains a coordinate value forming a complementary color pair with the converted coordinate value, based on a coordinate value within the given color space of the given color within a given reference environment and the converted coordinate value;
   a correction section that corrects input-output characteristic data for display that is used by a display section to display the image, based on the obtained coordinate value forming the complementary color pair; and
   a display section that displays the presentation image, based on the corrected input-output characteristic data, the complementary color pair comprising colors forming gray when mixed together with the converted coordinate value within the visual environment.

7. The presentation system as defined by claim 6, the correction section performing gamma correction as correction of the input-output characteristic data, based on the coordinate value forming the complementary color pair.

8. The presentation system as defined by claim 7, the display region being a region on a screen, and the display section comprising a projection section that projects the presentation image towards the screen.

9. The presentation system as defined by claim 8, the visual environment detection section detecting a visual environment that takes into account a type of the screen.

10. The presentation system as defined by claim 9, the visual environment detection section comprising a device that detects the visual environment by measuring at least ambient light.

11. An image processing method of environment-compliant type that corrects a color of an image adapting to a visual environment, the method comprising:
   detecting a visual environment;
   converting the detected visual environment into a coordinate value within a given color space;
   calculating value including obtaining a coordinate value forming a complementary color pair with a coordinate value converted by the conversion step, based on a coordinate value within the given color space of the given color in a given reference environment and the converted coordinate value;
   correcting input-output characteristic data for display, based on the obtained coordinate value forming the complementary color pair; and
   displaying an image, based on the corrected input-output characteristic data, the complementary color pair comprising colors forming gray when mixed together with the converted coordinate value within the visual environment.

12. The image processing method as defined by claim 11, the calculating of the coordinate-value comprising obtaining an inverse vector of a bound vector that indicates a coordinate position of the converted coordinate value within the color space, as the coordinate value forming the complementary color pair, and
   the correcting of the input-output characteristic data being based on the obtained inverse vector as a correction value.

13. The image processing method as defined by claim 11, the calculating of the coordinate-value comprising obtaining a coordinate position of an externally dividing point that forms a coordinate position of the coordinate value forming the complementary color pair, based on a distance between a coordinate position of the converted coordinate value in the converting of the detected visual environment and a given origin within the color space, as the coordinate value forming the complementary color pair, and
   the correcting of the input-output characteristic data includes a corrected value for the coordinate position of the obtained externally dividing point.

14. The image processing method as defined by claim 11, the correcting of the input-output characteristic data includes performing a gamma correction as correction of the input-output characteristic data based on the coordinate value forming the complementary color pair.

15. The image processing method as defined by claim 11, the correcting of the input-output characteristic data includes performing a correction of a color reproduction region as correction of the input-output characteristic data based on the coordinate value forming the complementary color pair.

16. The image processing method as defined by claim 11, the calculating of the coordinate-value comprising obtaining coordinate values of a plurality of complementary color pairs for each given grayscale unit.

17. A computer-readable information storage medium on which is recorded a program for correction a color of a presentation image and displaying the presentation image, adapting to a visual environment, the program causing a computer to function as:
   a visual environment detection section that detects the visual environment within a display region of the presentation image, and creates visual environment information;
   a colored-light information processing section that converts the visual environment information into a coordinate value within a given color space, and obtains a coordinate value forming a complementary color pair with converted coordinate value, based on a coordinate value within the given color space of within a given reference environment and the convened coordinate value;
   correction section that corrects input-output characteristic data for display that is used by the image, based on the obtained coordinate value forming the complementary color pair; and device that controls a display section to display the presentation image, based on the corrected input-output characteristic data, the complementary pair comprising colors forming gray when mixed together with the converted coordinate value within the visual environment.

18. The computer-readable information storage medium as defined by claim 17, wherein the program stored thereon causes the correction section performing a gamma correction as correction of the input-output characteristic data, based on the coordinate value forming the complementary color pair.

19. The computer-readable information storage medium as defined by claim 18, wherein the program stored thereon causes the display region being a region on a screen, and the display section comprising a projection means which projects the presentation image towards the screen.

20. The computer-readable information storage medium as defined by claim 19, wherein the program stored thereon causes the visual environment detection section detecting a visual environment that takes into account at least a type of screen.

21. The computer-readable information storage medium as defined by claim 20, wherein the program stored thereon causes the visual environment detection section detecting a visual environment that takes into account at least ambient light.

* * * * *